US006401211B1

(12) United States Patent
Brezak, Jr. et al.

(10) Patent No.: US 6,401,211 B1
(45) Date of Patent: Jun. 4, 2002

(54) SYSTEM AND METHOD OF USER LOGON IN COMBINATION WITH USER AUTHENTICATION FOR NETWORK ACCESS

(75) Inventors: John E. Brezak, Jr., Woodinville; Richard B. Ward, Redmond; Michael M. Swift; Paul J. Leach, both of Seattle, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/525,419

(22) Filed: Mar. 15, 2000

Related U.S. Application Data (60) Provisional application No. 60/160,477, filed on Oct. 19, 1999.

(51) Int. Cl.[7] .......................... G06F 11/00; G06F 13/14; G06F 15/173; H04L 9/00; H04L 12/66
(52) U.S. Cl. ........................................ 713/201; 713/200
(58) Field of Search ................................. 713/200, 201, 713/202, 155, 156, 157, 183, 185; 707/10, 9, 203, 201

(56) References Cited

U.S. PATENT DOCUMENTS

| 5,455,953 | A | * | 10/1995 | Russell .................... 710/266 |
| 5,684,950 | A | * | 11/1997 | Dare et al. ................ 713/201 |
| 6,023,464 | A | * | 2/2000 | Woundy .................... 370/352 |
| 6,128,738 | A | | 10/2000 | Doyle et al. ............... 713/185 |
| 6,208,991 | B1 | * | 3/2001 | French et al. ............... 707/10 |

FOREIGN PATENT DOCUMENTS

EP   WO 99/53391   * 10/1999

OTHER PUBLICATIONS

Computerworld, Users Ask for Single Log–Ons. p. 37, Jul. 26, 1993.

R. Moskowitz. The Battle of the Logon Titans, Network Computing, n. 903, p. 37, 1998.

D. Backman. KerbNet Takes a Bite Out of Hackers. Network Computing, n. 807, p. 42, 1997.

D. Backman, Kerberos: A Piece of the Net Security Puzzle. Network Computing, n. 719, p. 156, 1996.

Neuman, Clifford et al. The Kerberos Network Authentication Service (V5)—draft. [web page] Jun. 25, 1999; http://search.ietf.org/internet–drafts/draft–ietf–cat–kerberos–revisions–04.txt. [Accessed Nov. 8, 1999].

* cited by examiner

Primary Examiner—Ly V. Hua
(74) Attorney, Agent, or Firm—Leydig, Voit & Mayer, Ltd.

(57) ABSTRACT

A system and method of combined user logon-authentication provides enhanced logon performance by utilizing communications with a network access control server for user authentication to provide user account data required for user logon. When a user logs on a computer, the computer initiates a network access control process with a network access control server for obtaining access to network services, including the computer that the user is logging on. During the access control process, the network access control server authenticates the user and queries a directory service for the account data for the user. The network access control server includes the user account data in one of the communication packets sent to the computer in the network access control process. The computer retrieves the user account data from the communication packet and uses the data to complete the user logon.

12 Claims, 5 Drawing Sheets

SYSTEM AND METHOD OF USER LOGON IN COMBINATION WITH USER AUTHENTICATION FOR NETWORK ACCESS

RELATED APPLICATIONS

This application claims the benefit of U.S. Provisional Application No. 60/160,477, filed Oct. 19, 1999.

TECHNICAL FIELD OF THE INVENTION

This invention relates generally to computer access control, and more particularly to a process of obtaining user account data in a computer logon procedure.

BACKGROUND OF THE INVENTION

Ever since the advent of digital computers, access control has been an important topic of computer security. To protect the integrity of computer systems and the confidentiality of important data, various access control schemes have been implemented to prevent unauthorized users and malicious attackers from gaining access to computer resources.

To ensure the comprehensiveness of computer security, access control is often implemented on various levels. For instance, on the level of one computer, a user is typically required to go through a logon procedure in which the computer determines whether the user is authorized to use the computer. In addition, on the level of a computer network, a user is commonly required to go through a user-authentication process for purposes of controlling the user's access to various network services. Even after the user has been authenticated by a network access control server, the user may still have to request a permit for a specific server in order to access that service. Various schemes based on different protocols, such as the Kerberos 5 protocol, have been proposed and implemented for controlling network access control by means of user authentication.

Generally, the user logon for a computer and the user authentication for network access control are two separate procedures. Nevertheless, to minimize the burden on a user in dealing with the different access control schemes, the user logon and the user authentication for network access are sometimes performed together. For example, in the case where the user authentication is implemented under the Kerberos protocol, when the user logs on the computer, the computer may also initiate a Kerberos authentication process. In the authentication process, the computer contacts a Kerberos Key Distribution Center (KDC) to first obtain a ticket-granting ticket (TGT) for the user. The computer can then use the TGT to obtain from the KDC a session ticket for itself.

Performing the user logon and user authentication for network access control together is desirable from a user's point of view, because the user does not have to enter her password or other security information multiple times.

Nevertheless, due to the extra network access involved, the combined logon and authentication process can take much longer time to complete and are more prone to failure due to network or service failure. There is therefore a need to more effectively combine the logon and user authentication processes to improve the success rate and speed of the combined logon process.

SUMMARY OF THE INVENTION

In view of the foregoing, the present invention provides a method and system for an improved combined logon process that utilizes network communications with a network access control server for gaining network access to provide the user's account data needed for logon. When a user tries to log on a computer, the computer initiates a user authentication process with a network access control server for purposes of obtaining access to network services, which include the computer that the user intends to log on. During the authentication process, the network access control server queries a directory service for the account data for the user. After obtaining the user's account data, the network access control server includes the account data in a network access response sent to the computer as part of the network access control process. The computer then retrieves the user account data from the communication packet and uses the data to complete the user logon. The inclusion of the account data in the network access response removes the need for the computer to independently contact another service, such as the directory service, to obtain the account data. The reduction of network communications involved makes the combined logon-authentication process faster and less prone to failure.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations,. including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
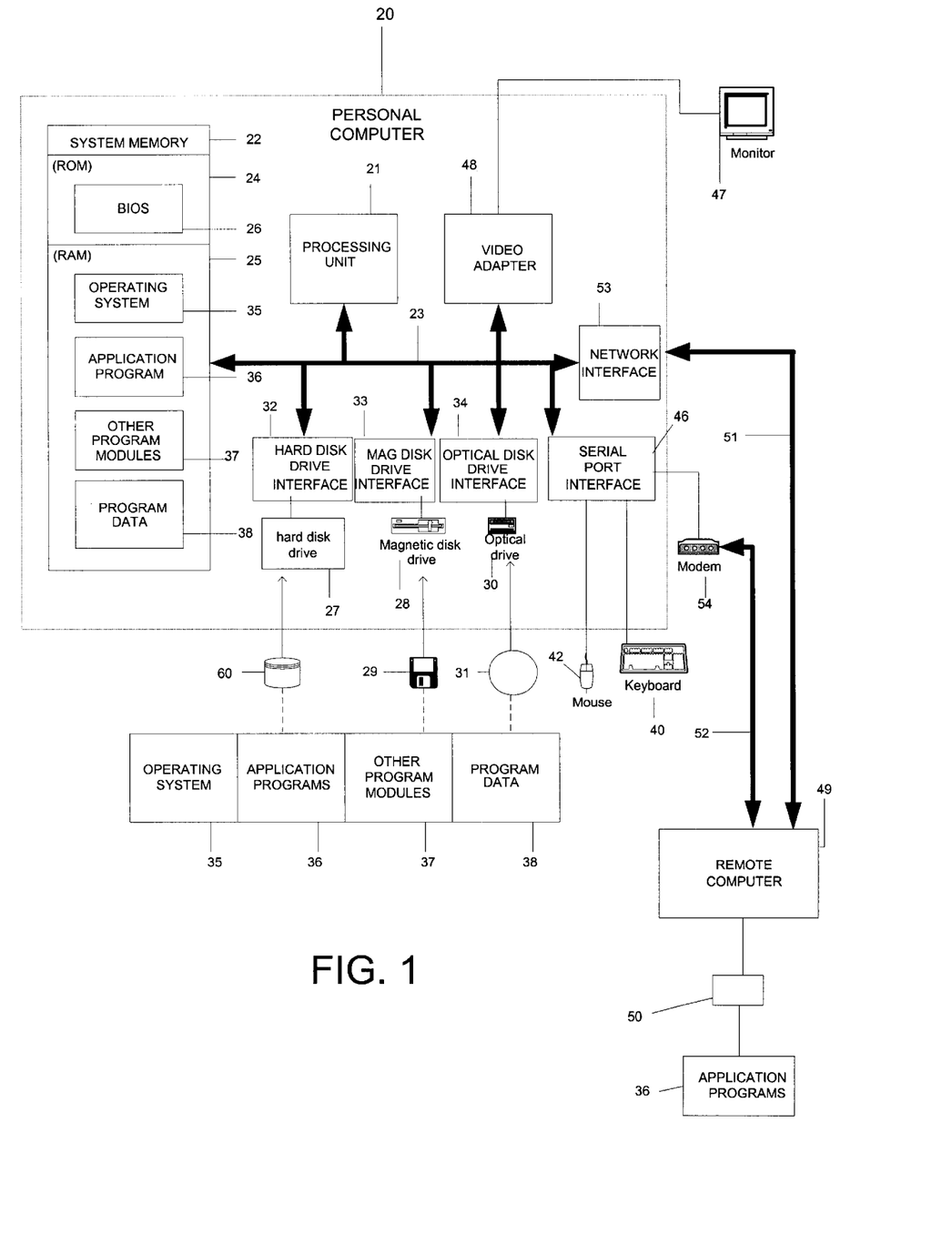
FIG. 1 is a block diagram generally illustrating an exemplary computer system on which the present invention may be implemented.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WA networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
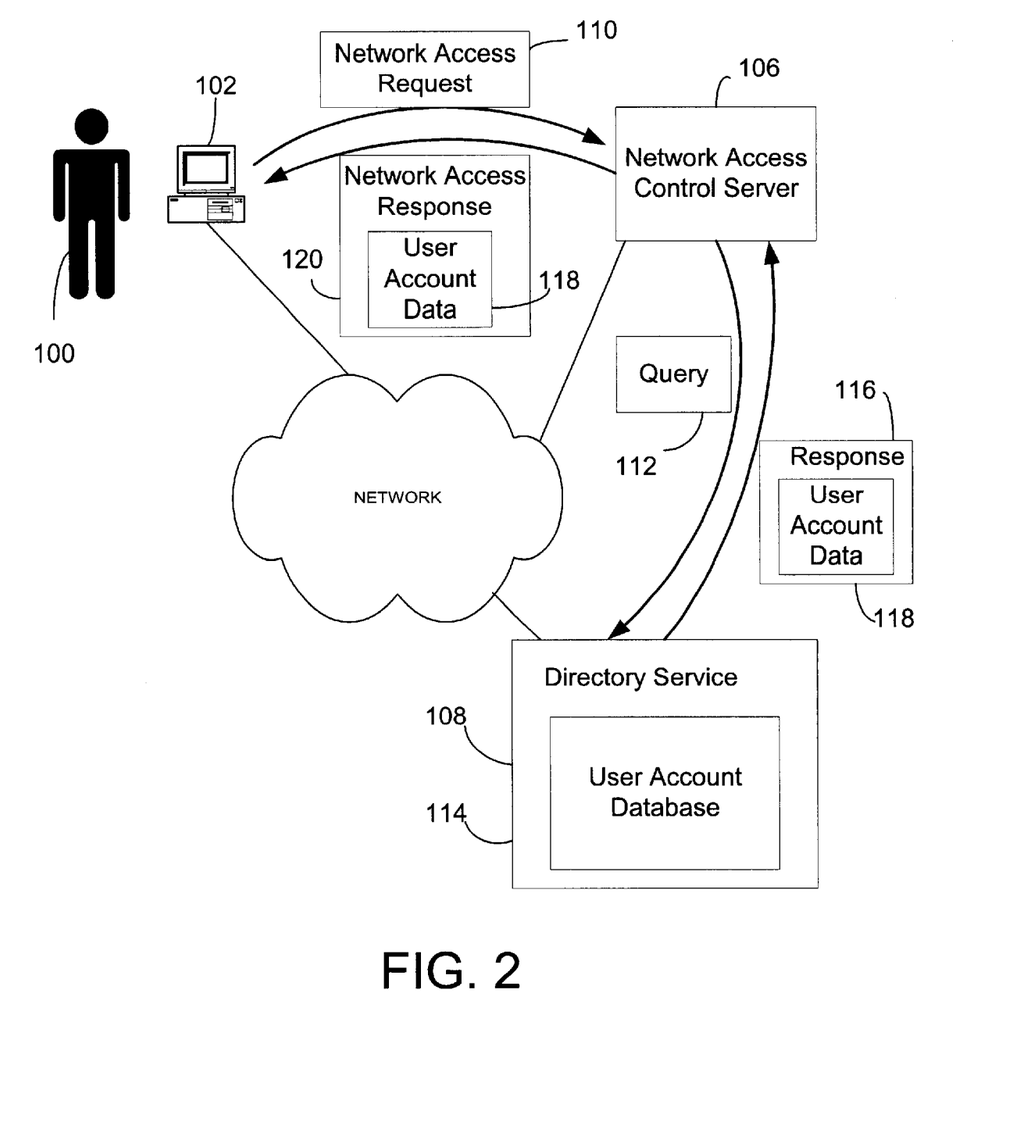
FIG. 2 is a schematic diagram showing the communications between a computer and a network access control server for performing the user logon procedure in accordance with the invention.

Referring now to FIG. 2, the present invention is directed to an improved logon/authentication process that combines the logon process for determining whether to permit a user 100 to use a computer 102 with the process of authenticating the user for purposes of controlling access of the user to network services. In this regard, the computer 102 that the user intends to use is one of the available network services. The network access control involves the participation of a network access control server 106, which may be implemented according to one of various authentication schemes under different authentication protocols. Regardless of how the network access control is implemented, the authentication process involves the computer's verifying the user's credentials with the network access control server, and the server's authenticating the user based on the user's credentials.

Moreover, in order to determine whether to allow the user 100 to logon, the computer 102 has to obtain account data of the user, and make the decision based on the account data. The account data may include various information, but typically may include, for example, where the user's profile is located and how it should be loaded, the last logon and logoff times of the user, the expiration date of the user's password, authorization data, etc. In accordance with an aspect of the invention, the computer does not have to make any extra network requests to obtain the needed account data for the user. Instead, the user logon is effectively integrated with the user authentication for network access control such that the account data are sent by the network access control server in a response to the computer during the user authentication process.

As shown in FIG. 2, the logon process is initiated by a user 100 by entering input, such as her password, user name, and/or other credential data, required for logon. After receiving the user input for logging on the computer 102, the computer initiates an authentication process by sending a network access request 110 to the network access control server 106. This request 110 identifies the user 100 that wants to log on the computer and includes the user's credentials for authentication. After receiving the request, the network access control server 106 retrieves the credentials from the request and authenticates the user. The network access control server 106 then sends a query 112 to a directory server or the like that maintains account data for different users. Upon receiving the request, the directory server searches its database 114 for the account data for the user identified in the query. If such data are found, the directory server returns them to the network access control server in a response 116. In one embodiment of the invention, the computer may indicate in the network access request 110 the types of user account data it needs for the logon operation, and the network access control server will retrieve the specified user account data from the directory server. In another embodiment, the computer can indicate in the network access request 110 whether it wants the network access control server to provide the user account data. If the computer indicates that it does not require the user account data, then the network access control server does not have to access the directory server to obtain such data.

After receiving the account data 118, the network access control server 106 includes the data in a network access response packet 120 that is part of the communications between the network access control server and the computer in carrying out the network access control. When the computer receives the response, it retrieves the account data for the user and uses them to complete the logon process. It will be appreciated that which response message in the network access control protocol is used to carry the account data and the exact format of the account data in the response would depend on the specific network control scheme and authentication protocol used and can vary in different implementations.

In a preferred embodiment, the network access control by means of user authentication is based on the Kerberos protocol, and the user logon procedure is integrated with the Kerberos authentication process. Although the following description is directed mostly to this embodiment based on the Kerberos protocol, it will be appreciated that the user account data retrieval technique of this embodiment can be readily adapted for use with other ticket-based authentication protocols.

Under the Kerberos protocol, when a client wants to establish a session with a service, it has to have a session key and a session ticket for the purpose of authenticating itself with that service. The session key and the session ticket are issued by a Kerberos Key Distribution Center ("KDC") upon request by the client. Since the KDC is itself a service, the client has to first obtain a session key and a session ticket for transactions with the KDC before it can request for session keys and tickets for other services. This special session ticket for communicating with the KDC is called a "ticket-granting ticket" ("TGT"), and the associated session key is called a "logon session key." When the client wants to access a service other than the KDC, it sends a request, including the TGT, to the KDC for a session ticket for that service. The KDC responds to the request by issuing a session ticket for the target service to the client, which then uses the service session ticket to access the target service.

The Kerberos protocol includes three subprotocols. The subprotocol in which the KDC gives a client a logon session key and a TGT is known as the Authentication Service (AS) Exchange. The subprotocol in which the KDC distributes a service session key and a session ticket for a requested service to the client is known as the Ticket-Granting Service (TGS) Exchange. The subprotocol in which the client presents the session ticket for admission to a service is called the Application Protocol (AP) Exchange.

Figure 3:
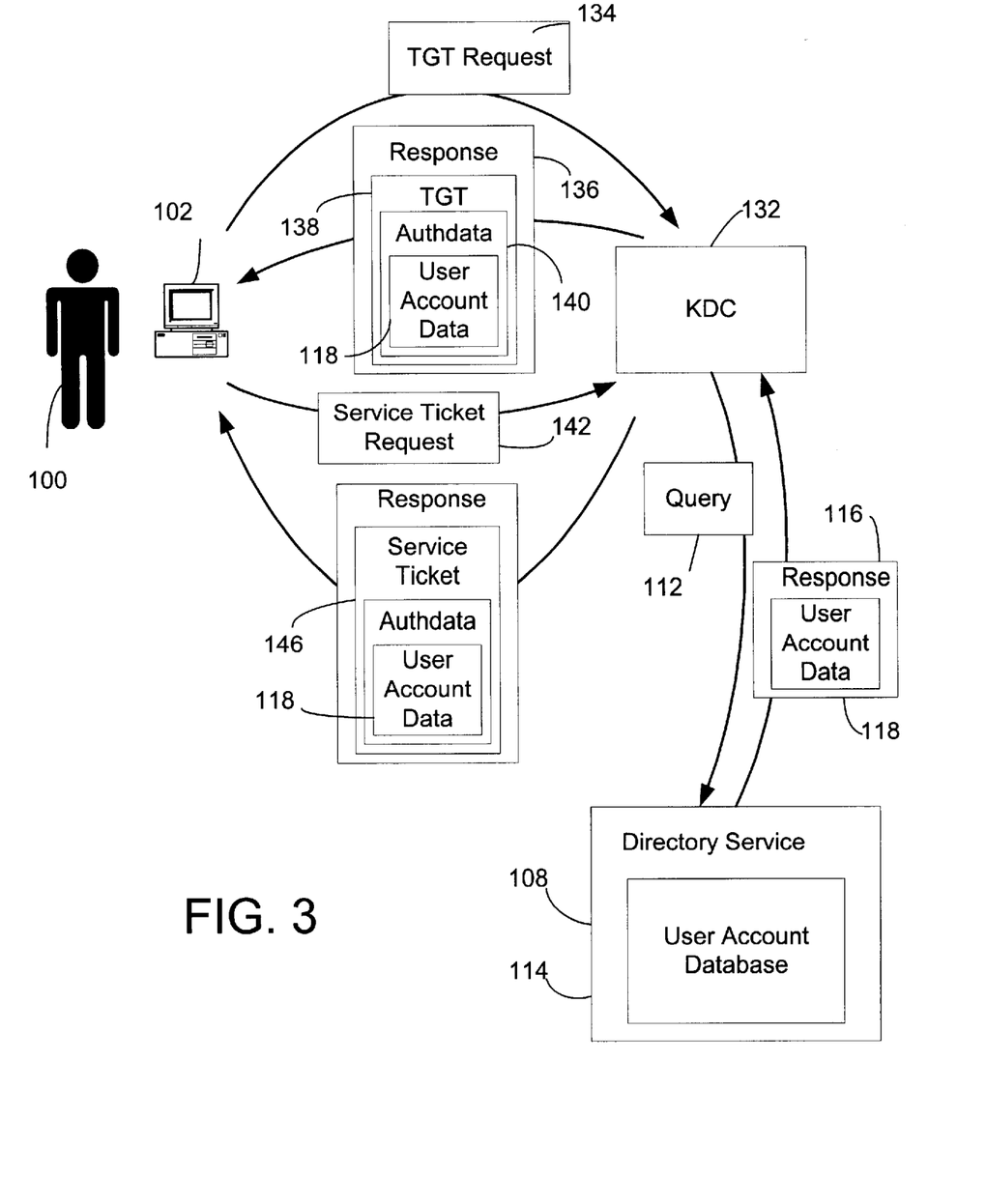
FIG. 3 is a schematic diagram showing an embodiment of the invention that performs user authentication for network access control based on the Kerberos protocol.
Figure 4:
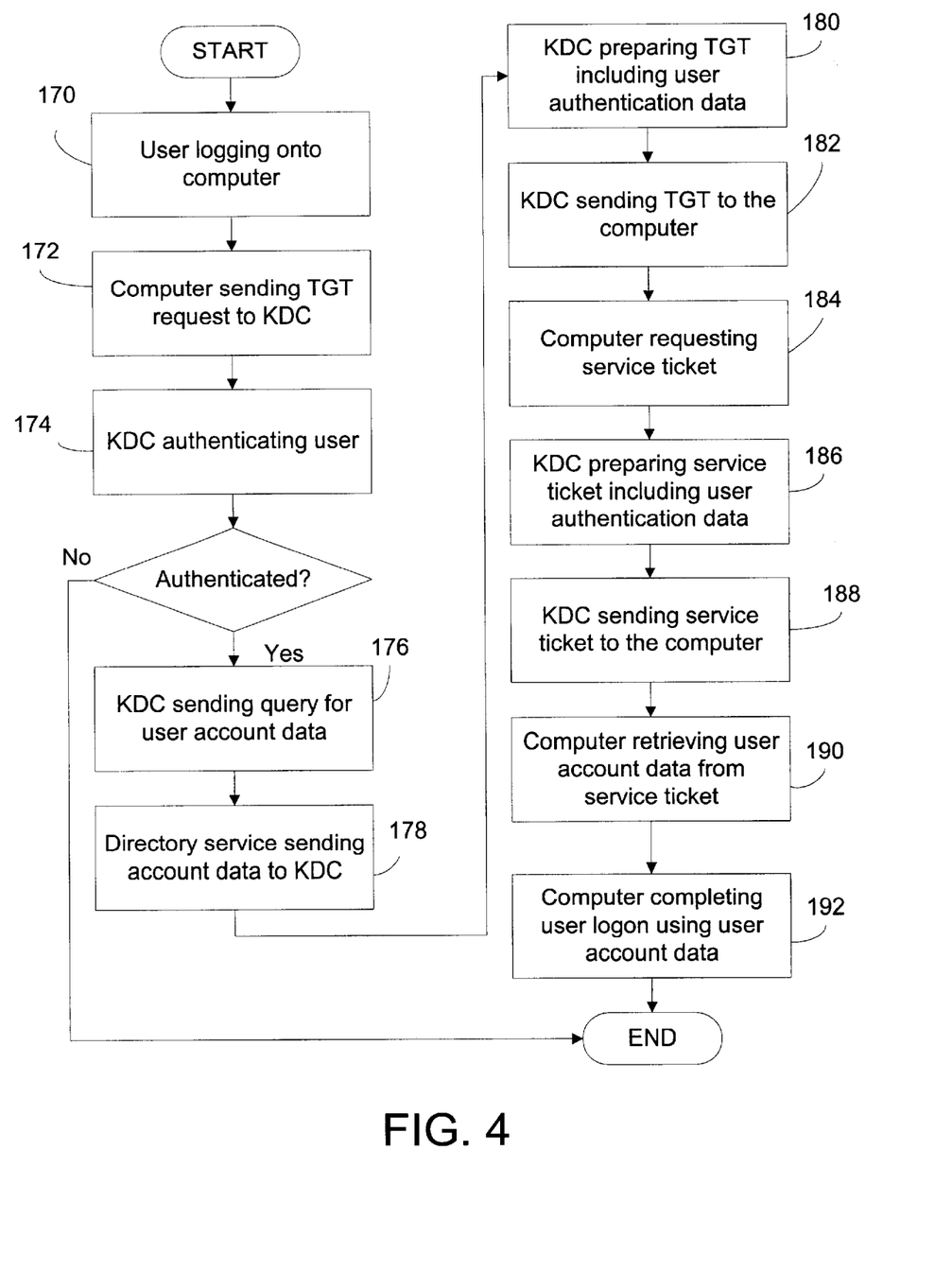
FIG. 4 is a flow chart showing a combined user logon-authentication process in the embodiment shown in FIG. 3.

Turning now to FIGS. 3 and 4, in this embodiment, the retrieval of user account data for logon is integrated with the authentication process with a Kerberos Key Distribution Center (KDC) 132. When the user 100 logs onto the computer 100 (step 170), the computer sends a request 134 for a ticket-granting ticket (TGT) for the user to the KDC 132 (step 172). After receiving the TGT request 134, the KDC 132 uses the user's credentials in the request to authenticate the user (step 174). The KDC then sends a query 112.to a directory service 108 for the account data for the user (step 176). The greatest efficiency is achieved when the KDC and the directory service are on the same computer, as is the case of a preferred embodiment. The directory service 108 retrieves the account data for the user and sends the data to the KDC (step 178). The KDC then packages the account data received from the directory server in a response packet 136 for responding to the TGT request (step 180). The response packet 136 includes a TGT 138 if the user has been successfully authenticated. As will be described in greater detail below, in this embodiment, the account data 118 are included in the Kerberos authorization data ("authdata") field 142 in the ticket granting ticket. The KDC signs the TGT 138, encrypts the ticket with its key, and includes the ticket in the response to the computer (Step 182).

After receiving the TGT 138, the computer 102 uses the TGT to prepare and send a request 142 for a service ticket for the user to use the computer (step 184). Note that the computer 102 is itself a network service, and any access to it is controlled in accordance with the Kerberos authentication scheme. When the KDC 132 receives the request 142, it takes the TGT 138 from the request, and uses the TGT with the account data enclosed in the authdata to create a service ticket 146 for the computer (step 186). In this process, the user account data in the authdata field are propagated from the TGT 138 to the service ticket 146. The KDC 132 then encrypts the service ticket 146 for the computer with the service key and returns it to the computer (step 188). When the computer receives the service ticket, it uses its service key to decrypt the service ticket and recovers the account data 118 for the user from the authdata field (step 190). The computer then uses the account data to complete the logon process for the user to use the computer (step 192), which may include building a security token, loading the user's profile, creating the desktop environment and starting the shell program for the user.

The inclusion of the user account data 118 in the service ticket 146 removes the need for the computer 102 to independently access the directory service 108 for such data. It will be appreciated that the avoidance of such network access eliminates a significant amount of network communications from the combined logon-authentication process. This is because in order to access the directory service 108, the computer 102 has to go through the regular Kerberos process of obtaining a service ticket for the directory service from the KDC, presenting the service ticket to the directory service, requesting for the account data for the user, and then waiting to receive the account data from directory service. As a result of the elimination of these network communications, the entire logon process can be completed much faster and is less likely to fail due to problems with network traffic or the directory service.

Figure 5:
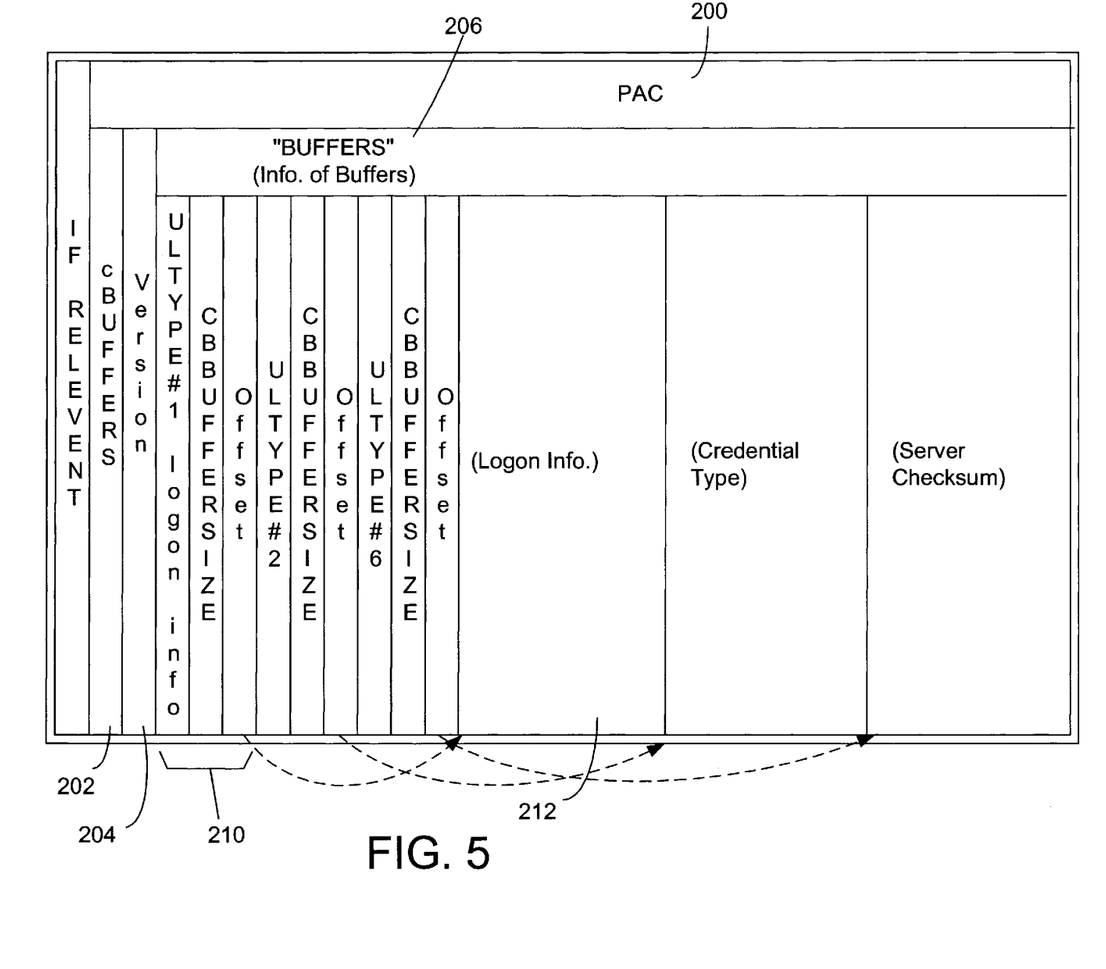
FIG. 5 is a schematic diagram showing an exemplary data structure for containing the user account data in a Kerberos ticket.

FIG. 5 shows the data structure of an exemplary user account data block 200, hereinafter referred to as a Privilege Attribute Certificate ("PAC"). Such a PAC is generated by the KDC during the process of responding to a Kerberos AS request that has been validly authenticated, or during a TGS request when the client's TGT does not already contain a PAC. The PAC is included in an IF-RELEVANT portion of the authorization data in the ticket. Because under the Kerberos protocol a service processes an IF-RELEVANT section only if it is relevant, putting the PAC in the IF-RELEVANT section allows services that do not understand the account information to ignore it.

As shown in FIG. 5, the PAC 200 is made up of several layers. The outer layer contains three fields: a cBuffers field 202, a Version field 204, and a Buffers field 206. The Version field is for containing the version number of the protocol. The cBuffers field is the numbers of entries in an array contained in the field Buffers. The array in the Buffers field is conformant array of a $PAC_{13}$ $INFO_{13}$ BUFFER structure as follows:

```
typedef struct_PAC_INFO_BUFFER {
    ULONG ulType;
    ULONG cbBufferSize
    ULONG64 Offset;
} PAC_INFO_BUFFER, *PPAC_INFO_BUFFER;
```

In this structure, the variable ulType indicates the type of data contained in the associated buffer. The variable cbBufferSize is the size of the associated data buffer. The variable Offset is the offset from the beginning of the PACTYPE structure to the beginning of the associated data buffer. In the exemplary implementation, the ulType may have one of the following values:

```
#define PAC_LOGIN_INFO           1
#define PAC_CREDENTIAL_TYPE      2
#define PAC_SERVER_CHECKSUM      6
#define PAC_PRIVSVR_CHECKSUM     7
#define PAC_CLIENT_INFO_TYPE    10
```

In the illustrated implementation, a PAC_INFO_BUFFERS entry 210 of the type PAC_LOGON_INFO contains the information about a buffer 212 that contains the account data for the user involved in the logon process. The buffer 212 for the user account data is organized in a KERB_USER_ACCOUNT_INFO structure as follows:

```
typedef struct_KERB_USER_ACCOUNT_INFO {
    FILETIME LogonTime;
    FILETIME LogOffTime;
    FILETIME KickOffTime;
    FILETIME PasswordLastSet;
    FILETIME PasswordCanChange;
    FILETIME PasswordMustChange;
    UNICODE_STRING Effectivename;
    UNICODE_STRING FullName;
    UNICODE_STRING LogonStript;
    UNICODE_STRING ProfilePath;
    UNICODE_STRING HomeDirectory;
    UNICODE_STRING HomeDirectoryDrive;
    USHORT LogonCount;
    USHORT BadPasswordCount;
    ULONG UserID;
    ULONG PrimaryGroupID
    ULONG GroupCount;
    [size_is (GroupCount)] PGROUP_MEMBERSHIP GroupIds;
    ULONG UserFlags;
    ULONG Reserved [4];
    UNICODE_STRING LogonServer;
    UNICODE_STRING LogonDomainName;
    PSID LogonDomainID;
    ULONG Reserverd1 [2};
    ULONG UserAccountControl;
    ULONG Reserved3 [7];
    ULONG SidCount;
    [size is (SidCount)] PKERB_SID_AND_ATTRIBUTES
    ExtraSids;
    PSID ResourceGroupDomainSid;
    ULONG ResourceGroupCount;
    [size is (ResourceGroupCount)] PGROUP_MEMBERSHIP
    ResourceGroupIDs;
} KERB_USER_ACCOUNT_INFO;
```

The fields in this structure are defined as follows:

LogonTime—the time the client last logged on.

LogOffTime—the time at which the client's logon session should expire. If the logon session should not expire, this field should be set to (0x7fffffff,0xffffffff).

KickOffTime—the time at which the server should forcibly logoff the client. If the client should not be forced to log off, this field should be set to (0x7fffffff, 0xffffffff).

PasswordLastSet—the time the client's password was last set.

If is was not set, this field is zero.

PasswordCanChange—the time at which the client's password is allowed to change. If there is no restriction on when the client may change the password, this field should be set to the time of the logon.

PasswordMustChange—the time at which the client's password expires. If it never expires, this field is set to (0x7fffffff,0xffffffff).

EffectiveName—this field contains the client's user name.

FullName—this field contains the friendly name of the client, which is used only for display purposes and not for security purposes. This field is optional in this embodiment.

LogonScript—this field contains the path to the client's logon script. This field is option in this embodiment.

ProfilePath—this field contains the path to the client's profile. This field is optional in this embodiment.

HomeDirectory—this field contains the path to the client's home directory. It may be either a local path name or a UNC path name. This field is optional in this embodiment.

HomeDirectoryDrive—this field preferably is used only if the client's path name is a UNC path name. In that case, the share on the remote file server is mapped to the local drive letter specified by this field. This field is optional in this embodiment.

LogonCount—this field contains the count of how many times the client has logged on.

BadPasswordCount—this field contains the number of logon or password change attempts with bad passwords, since the last successful attempt.

UseId—this field contains the relative ID for the client.

PrimaryGroupd—this field contains the relative ID for the client's primary group.

GroupCount—this field contains the number of groups within the client's domain to which the client is a member.

GroupIds—this field contains an array of the relative Ids and attributes of the groups in the client's domain of which the client is a member.

UserFlags—this field contains information about which fields in this structure are valid. The two bits that may be set are indicated below. Having these flags set indicates that the corresponding fields in the KERB_USER_ACCOUNT_INFO structure are present and valid.

define LOGON_EXTRA_SIDS 0x0020

LogonServer—this field contains the NETBIOS name of the KDC which performed the AS ticket request.

LogonDomainName—this field contains the NETBIOS name of the client's domain.

LogonDomainID—this field contains the SID of the client's domain. This field is used in conjunction with the UserId, PrimaryGroupId, and GroupIds fields to create the user and group SIDs for the client.

UserAccountControl—this field contains a bitfield of information about the client's account. Valid values are:

```
#define USER_ACCOUNT_DISABLED            (0x00000001)
#define USER_HOME_DIRECTORY_REQUIRED     (0x00000002)
#define USER_PASSWORD_NOT_REQUIRED       (0x00000004)
#define USER_TEMP_DUPLICATE_ACCOUNT      (0x00000008)
#define USER_NORMAL_ACCOUNT              (0x00000010)
#define USER_MNS_LOGON_ACCOUNT           (0x00000020)
#define USER_INTERDOMAIN_TRUST_ACCOUNT   (0x00000040)
#define                                  (0x000000800)
USER_WORKSTATION_TRUST_ACCOUNT
#define USER_SERVER_TRUST_ACCOUNT        (0x00000100)
```

SidCount—this field contains the number of SIDS present in the ExtraSids Field. This field is valid only if the LOGON_EXTRA_SIDS flag has been set in the UserFlags field.

ExtraSids—this field contains a list of SIDs for groups to which the user is a member. This field is valid only if the LOGON_EXTRA_SIDS flag has been set in the UserFlags field.

The KERB_USER_ACCOUNT_INFO structure described above include two data types: FILETIME and UNICODE_STRING. The type FILETIME is defined as:

```
typedef struct_FILETIME {
    DWORD dwLowDateTime;
    DWORD dwHighDateTime;
    } FILETIME, *PFILETIME, *LPFILETIME;
```

For this structure, a time is encoded as the number in 100 nano-second increments since Jan. 1, 1601, in UTC time.

The UNICODE_STRING structure is defined as:

```
typedef struct_UNICODE_STRING
    USHORT Length;
    USHORT MaximumLength;
    [size is(MaximumLength/2), length)_is (Length /2)]
USHorT * Buffer;
} UNICODE_STRING;
```

The field Length. contains the number of bytes in the string, not including the null terminator. The MaximumLength field contains the total number of bytes in the buffer containing the string.

The GROUP_MEMBERSHIP structure contains the relative ID of a group and the corresponding attributes for the group as defined below:

```
typedef struct GROUP_MEMBERSHIP {
    ULONG RelativeId;
    ULONG Attributes;
    } GROUP_MEMBERSHIP, *PGROUP_MEMBERSHIP;
```

The group attributes may be the following;

```
#define SE_GROUP_MANDATORY            (0x00000001L)
#define SE_GROUP_ENABLED_BY_DEFAULT   (0x00000002L)
#define SE_GROUP_ENABLED              (0x00000004L)
```

The SID structure is defined as:

```
typedef unsigned char UCHAR
typedef struct_SID_IDENTIFIER_AUTHORITY {
    UCHAR Value [6];
    } SID_IDENTIFIER_AUTHORITY,
*PSID_IDENTIFIER_AUTHORITY;
typedef struct_SID {
    UCHAR Revision;
    UCHAR SubAuthorityCount;
    SID_IDENTIFIER_AUTHORITY IdentifierAuthority;
    [size_is (SubAuthorityCount)] ULONG SubAuthority [*];
    } SID, *PSID;
```

The SubAuthorityCount field in this structure contains the number of elements in the actual SubAuthority conformant array. In this implementation, the maximum number of subauthorities allowed is 15, the Revision number is set to 1, and the IdentifierAuthority value is set to 5 to indicate the authority as Microsoft Corporation.

The KERB_SID_AND_ATTRIBUTES structure contains the entire group SIDs and their corresponding attributes and defined as follows:

```
typedef struct KERB_SID_AND_ATTRIBUTES {
    PSID Sid;
    ULONG Attributes;
    }KERB_SID_AND_ATTRIBUTES,
    *PKERB_SID_AND_ATTRIBUTES;
```

The client information is included in the PAC for ensuring that the PAC in the ticket is indeed for the client of the ticket. Due to the Kerberos protocol, it is possible to pull the PAC from one ticket and insert it into another ticket. Including the client information in the PAC to allow a server to verify that the PAC is associated with the ticket. The PAC_CLIENT_INFO structure is included in a PAC_INFO_BUFFER of the type PAC_CLIENT_INFO_TYPE:

```
typedef struct PAC_CLIENT_INFO {
    FILETIME ClientId;
    USHORT NameLength;
    WCHAR Name [ANYSIZE_ARRAY];
} PAC_CLIENT_INFO, *PPAC_CLIENT_INFO;
```

The fields in this structure are defined as follows:
ClientId—this field contains a conversion of the Auth-Time field of the ticket into a FILETIME structure.
NameLength—this field contains the length, in bytes, of the Name field.
Name—this field contains the client name from the ticket, converted to the Unicode and encoded using "/" to separate parts of the client principal name with an "@" separating the client principal name from the realm name. The string is not null terminated.

Besides the fields in the PAC as described above, the KDC may return supplemental credentials in the PAC as well. Supplemental credentials include data associated with a security package. The PAC_CREDENTIAL_DATA structure is encoded according to the Network Data Representation ("NDR") standard and then encrypted with the key used to encrypt the KDC's reply to the client. The PAC_CREDENTIAL_INFO structure is included in PAC_INFO_BUFFER of type PAC_CREDENTIAL_TYPE. Supplemental credentials for a single package are NDR encoded as follows:

```
typedef struct_SECPKG_SUPPLEMENTAL_CRED {
    UNICODE_STRING PackageName;
    ULONG CredentialSize;
    [size_is (CredentialSize)] PUCHAR Credentials;
} SECPKG_SUPPLEMENTAL_CRED,
    *PSECPKG_SUPPLEMENTAL_CRED;
```

The fields in this structure are defined as follows:
PackageName—this field contains the name of the package for which credentials are presented.
CredentialSize—this field contains the length, in bytes, of the presented credentials.
Credentials—this field contains a pointer to the credential data.

The set of supplemental credentials is NDR encoded in a PAC_CREDENTIAL_DATA structure:

```
typedef struct_PAC_CREDENTIAL_DATA {
    ULONG CredentialCount;
    SECPKG_SUPPLEMENTAL_CRED
    Credentials[ANYSIZE_ARRAY]
} PAC_CREDENTIAL_DATA, *PPAC_CREDENTIAL_DATA;
```

The fields of this structure are defined as follows:
CredentialCount—this field contains the number of credential entries present in the Credentials array.
Credentials—this field contains an array of the presented supplemental credentials.

The PAC_CREDENTIAL_DATA structure is NDR encoded and then encrypted with the key used o encrypt the KDC reply. The resulting buffer is returned in the following structure:

```
typedef struct_PAC_CREDENTIAL_INFO {
    ULONG VERSION;
    ULONG EncryptionType;
    UCHAR Data [ANYSIZE_ARRAY];
} PAC_CREDENTIAL_INFO, *PPAC_CREDENTIAL_INFO;
```

The fields in this structure are defined as follows:
Version—this field contains the version field of the key used to encrypt the data, and is set to zero if the field is not present.
EncryptType—this field contains the encryption type used to encrypt the data.
Data—this field contains an array of bytes containing the encrypted supplemental credential data.

Besides the data structures described above, the PAC may further contain two digital signatures: one using the key of the server, and one using the key of the KDC. The signatures are present for two reasons. First, the signature with the server's key is present to prevent a client from generating their own PAC and sending it to the KDC as encrypted authorization data to be included in the tickets. Second, the signature with the KDC's key is present to prevent an untrusted service from forging a ticket to itself with an invalid PAC. The two signatures are sent in PAC_INFO_BUFFERs of type PAC_SERVER_CHECkSUM and PAC_KDC_CHECKSUM, respectively. These signatures are contained in the following structure:

```
typedef struct_PAC_SIGNATURE_DATA {
    ULONG SignatureType;
    UCHAR Signature [ANYSIZE ARRAY];
} PAC_SIGNATURE_DATA, *PPAC_SIGNATURE_DATA;
```

The fields in this structure are defined as follows:
SignatureType—this field contains the type of checksum used to create a signature. The checksum preferably is a keyed checksum.
Signature—this field consists of an array of bytes containing the checksum data. The length of bytes may be determined by the wrapping PAC_INF_BUFFER structure.

For the server's checksum, the key used to generate the signature should be the same key used to encrypt the ticket. The key used to encrypt ticket granting tickets is used to generate the KDC's checksum.

In the exemplary implementation, the checksums are computed in the following steps:
1. The complete PAC is built, including space for both checksums.
2. The data portion of both checksums is zeroed.
3. The entire PAC structure is checksummed with the server's key, and the result is stored in the server's checksum structure.
4. the server's checksum is then checksummed with the KDC's key.
5. The checksum with KDC key is stored in the KDC's checksum structure.

Normally, the PAC is preferably included in every pre-authenticated ticket received from an AS request. A client, however, may also explicitly request either to include or to not include the PAC. This is done by sending the PA-REQUEST pre-authentication data defined below:

```
KERB-PA-PAC-REQUEST ::= SEQUENCE {
   include-pac[0] BOOLEAN    -- if TRUE, and no PAC present,
                             -- include PAC.
                             -- If FALSE, and PAC
                             -- PAC present, remove PAC
```

The field include-pac is defined as follows: include-pac—this field indicates whether a PAC should be included or not. If the value is TRUE, a PAC will be included independent of other. pre-authentication data. If the value is FALSE, then no PAC will be included, even if other pre-authentication data are present.

If the PAC is not present in the ticket, the computer may make a request directly to the directory service to get the required user account information. In an alternative embodiment, the computer can use local configuration information to fill in the required pieces of information and leave the optional pieces blank. This is because in this embodiment the local configuration information is a set of local user accounts onto which Kerberos accounts have been mapped. Thus, the computer can find the appropriate local account and get the information therefrom.

The pre-authentication ID is:
define KRB5_PADATA_PAC_REQUEST 128.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A computer-readable medium having computer-executable instructions for performing steps by a network access control server, comprising:
   receiving a first network access request from a computer for a user logging onto the computer;
   authenticating the user;
   querying an account service for account data for the user required for logging onto the computer;
   receiving account data for the user from the account service; and
   inserting the account data for the user in a network access control response; and
   sending the network access control response to the computer.

2. A computer-readable medium as in claim 1, wherein the network access control response includes an access control document for communicating with the network access control server and containing the account data for the user.

3. A computer-readable medium as in claim 2, including further computer-executable instructions for performing steps including:
   receiving a second network access request from the computer for an access control document for accessing the computer as a network service;
   inserting the account data for the user in an access control document for accessing the computer;
   sending the access control document for accessing the computer to the computer.

4. A computer-readable medium as in claim 3, wherein the access control document for communicating with the network access control server is a ticket-granting ticket.

5. A computer-readable medium as in claim 4, wherein the access control document for accessing the computer is a service ticket.

6. A computer-readable medium as in claim 5, wherein the step of inserting the account data for the user in the service ticket places the account data in an authorization data field in the service ticket.

7. A computer-readable medium as in claim 6, wherein the account server is a network directory server.

8. A computer-readable medium as in claim 1, wherein the first network access request identifies the account data required by the computer for the user logging onto the computer, and the step of querying queries the account service for the account data identified in the first network access request.

9. A computer-readable medium having computer-executable instructions for performing steps by a network access control server, comprising:
   receiving a ticket-granting ticket request from a computer for a user logging onto the computer;
   authenticating the user;
   querying an account service for account data for the user required for logging onto the computer;
   receiving account data for the user from the account service; and
   inserting the account data for the user in a ticket-granting ticket for the user; and
   sending the ticket-granting ticket for the user to the computer.

10. A computer-readable medium as in claim 9, wherein the step of inserting places the account data in an authorization data field of the ticket-granting ticket.

11. A computer-readable medium as in claim 10, having further computer-executable instructions for performing steps including:
   receiving a service ticket request from the computer, the service ticket request including the ticket-granting ticket for the user;
   transferring the account data for the user from the ticket-granting ticket into a service ticket for accessing the computer;
   sending the service ticket containing the account data for the user to the computer.

12. A computer-readable medium as in claim 9, wherein the network access control center is a Kerberos Key Distribution Center (KDC).

* * * * *

UNITED STATES PATENT AND TRADEMARK OFFICE
CERTIFICATE OF CORRECTION

PATENT NO. : 6,401,211 B1
DATED : June 4, 2002
INVENTOR(S) : Brezak, Jr. et al.

It is certified that error appears in the above-identified patent and that said Letters Patent is hereby corrected as shown below:

Column 2,
Line 4, "user authentication" should read -- user-authentication --.

Column 6,
Line 22, "112.to" should read -- 112 to --.

Column 7,
Line 26, "$PAC_{13}INFO_{13}BUFFER$" should read -- PAC_INFO_BUFFER --.

Column 8,
Line 17, "ULONGReserverd1[2};" should read -- ULONGReserved[2]; --.

Column 9,
Line 6, "PrimaryGroupd" should read -- PrimaryGroupId --.

Column 11,
Line 67, "o encrypt" should read -- to encrypt --.

Column 12,
Line 30, "...CHECkSUM" should read -- CHECKSUM --.

Signed and Sealed this

Sixteenth Day of March, 2004

JON W. DUDAS
*Acting Director of the United States Patent and Trademark Office*